United States Patent [19]

Tanaka et al.

[11] Patent Number: 5,690,342
[45] Date of Patent: *Nov. 25, 1997

[54] METAL GASKET ASSEMBLY WITH FULL BEADS, HALF BEADS, AND SHIMS

[75] Inventors: Akira Tanaka, Ohmiya; Masamichi Hoshi, Ohomiya, both of Japan

[73] Assignee: Nippon Leakless Industry Co., Ltd., Tokyo, Japan

[ * ] Notice: The term of this patent shall not extend beyond the expiration date of Pat. No. 5,568,932.

[21] Appl. No.: 691,015

[22] Filed: Aug. 5, 1996

Related U.S. Application Data

[62] Division of Ser. No. 312,397, Sep. 26, 1994, Pat. No. 5,601,292.

[30] Foreign Application Priority Data

Mar. 14, 1994 [JP] Japan .................................. 6-42468

[51] Int. Cl.$^6$ ............................................. F16J 15/08
[52] U.S. Cl. ................................ 277/180; 277/235 B
[58] Field of Search ...................... 277/180, 235 B, 277/234, 236

[56] References Cited

U.S. PATENT DOCUMENTS

| | | |
|---|---|---|
| 4,836,562 | 6/1989 | Yoshino . |
| 5,022,664 | 6/1991 | Kitada et al. . |
| 5,058,908 | 10/1991 | Udagawa . |
| 5,205,566 | 4/1993 | Ueta et al. . |
| 5,240,261 | 8/1993 | Udagawa et al. . |
| 5,280,928 | 1/1994 | Ueta et al. . |
| 5,568,932 | 10/1996 | Tanaka et al. ................. 277/235 B |
| 5,586,776 | 12/1996 | Kubouchi et al. ................. 277/235 B |

FOREIGN PATENT DOCUMENTS

| | | |
|---|---|---|
| 62-261761 | 11/1987 | Japan . |
| 63-246572 | 10/1988 | Japan . |
| 1-285644 | 11/1989 | Japan . |
| 2-58502 | 12/1990 | Japan . |
| 5-106738 | 4/1993 | Japan . |
| 6-11040 | 1/1994 | Japan . |
| 6-129541 | 5/1994 | Japan . |

*Primary Examiner*—Scott Cummings
*Attorney, Agent, or Firm*—Young & Thompson

[57] ABSTRACT

A metal gasket assembly for a cylinder head includes a metal substrate having a predetermined shape with apertures including cylinder openings, bolt holes, coolant openings and lubricant openings. The metal substrate is further provided with half-beads in regions adjacent to the cylinder openings and full-beads in regions therearound. Ring-shaped shims are attached to the metal substrate so that they come into contact with the half-beads on a substrate surface where bulges of the full-beads are not situated.

2 Claims, 6 Drawing Sheets

FIG_5A
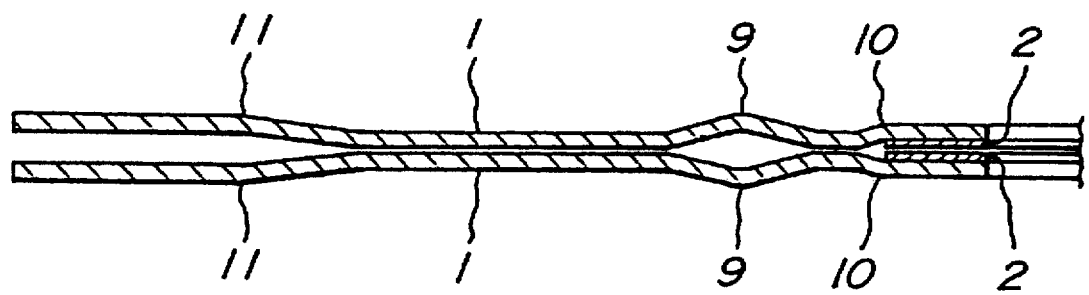
FIG_5B
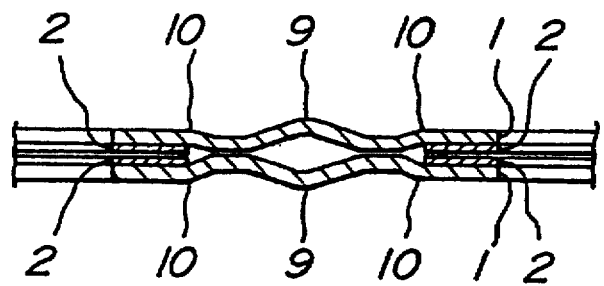

METAL GASKET ASSEMBLY WITH FULL BEADS, HALF BEADS, AND SHIMS

This application is a divisional of application Ser. No. 08/312,397, filed Sep. 26, 1994, now U.S. Pat. No. 5,601, 292.

BACKGROUND OF THE INVENTION

1. Field of the Invention

The present invention relates to a metal gasket assembly for a cylinder head of an internal combustion engine.

2. Description of the Related Art

Conventional metal gasket assemblies of this type generally comprise several metal plates. Some of such conventional metal gasket assemblies include metal plates which are provided with full-beads in regions adjacent to cylinder openings, and shims superposed on the plates in the circumferentially inner regions of the full-beads as disclosed in Japanese Patent Publication No. 2-58502. However, even with a conventional metal gasket assembly comprising such a metal plate that is provided with full-beads and shims, it has still been difficult to ensure effective sealing of explosive gas in recent high power engines. In order to assure effective sealing, it is necessary to increase bead resiliency by piling up many beads which are respectively formed on a metal plate. Accordingly, a conventional metal gasket assembly of this kind requires many metal plates, namely three to five of them, and thus it results in a high cost.

SUMMARY OF THE INVENTION

It is therefore an object of the present invention to provide an improved metal gasket assembly which is free from the disadvantages inherent in the conventional metal gasket assembly.

To attain the above-mentioned object, a metal gasket assembly for a cylinder head according to the present invention comprises:

a metal substrate having a predetermined shape with apertures including cylinder openings, bolt holes, coolant openings and lubricant openings, which metal substrate is provided with half-beads in regions adjacent to the cylinder openings and full-beads in regions therearound; and ring-shaped shims;

which ring-shaped shims are attached to said metal substrate so that they come into contact with the half-beads on a substrate surface Where bulges of the full-beads are not situated, on a side of the half-beads opposite the full-beads and in a recess defined by the half-beads.

As mentioned above, a metal gasket assembly according to the present invention has such a basic structure that a metal substrate is provided with full-beads formed in regions surrounding cylinder openings, as well as half-beads formed in circumferentially inner regions of the full-beads, and that ring-shaped shims are attached to the metal substrate so that they come into contact with the half-beads on a substrate surface where the bulges of the full-beads are not situated. The sealing effect of the metal gasket assembly according to the present invention is significantly improved when compared with conventional ones, because the regions around the cylinder openings, which require the most effective sealing in the gasket assembly, are provided with dual beads of the full-beads and the half-beads, and in addition the ring-shaped shims are attached onto the surfaces of the half-beads.

In other words, since the ring-shaped shims are superposed on the substrate metal in regions where the half-beads are situated, the metal gasket assembly has the largest thickness in these regions. Consequently, when the metal gasket assembly is fastened between a cylinder block and a cylinder head, the fastening pressure works most on these portions of the metal gasket assembly. Moreover, there is a terraced part of the half-bead on the circumferentially outer periphery of each shim, and a bulge of the full-bead on the circumferentially outer side of the half-bead, thereby constituting double or triple sealing for the cylinder opening, which exhibits an improved effect.

Also, since a dent is formed on the surface of a metal substrate between a bulge of each full-bead and an adjoining half-bead, a sealant (a coating material) tends to stand in this dent when the metal substrate is subjected to a coating, thereby further improving the sealing effect of the metal gasket assembly.

In modified metal gasket assemblies according to the present invention, some additional metal plates may be laminated together with the metal substrate having the above-described basic structure in order to increase the applied fastening pressure and the bead rigidity. Accordingly, the sealing function can be further improved in these metal gasket assemblies.

BRIEF DESCRIPTION OF THE DRAWINGS

FIG. 5A is an enlarged sectional view showing a part of a metal gasket assembly according to the fourth embodiment of the present invention, which corresponds to the portion shown in FIG. 2A;

FIG. 5B is an enlarged sectional view showing a part of a metal gasket assembly according to the fourth embodiment of the present invention, which corresponds to the portion shown in FIG. 2B;

It should be noted that the same reference numerals are used to denote the same or equivalent elements or components throughout the drawings.

DESCRIPTION OF THE PREFERRED EMBODIMENT

The present invention will be explained below in further detail with reference to the accompanying drawings.

Figure 1:
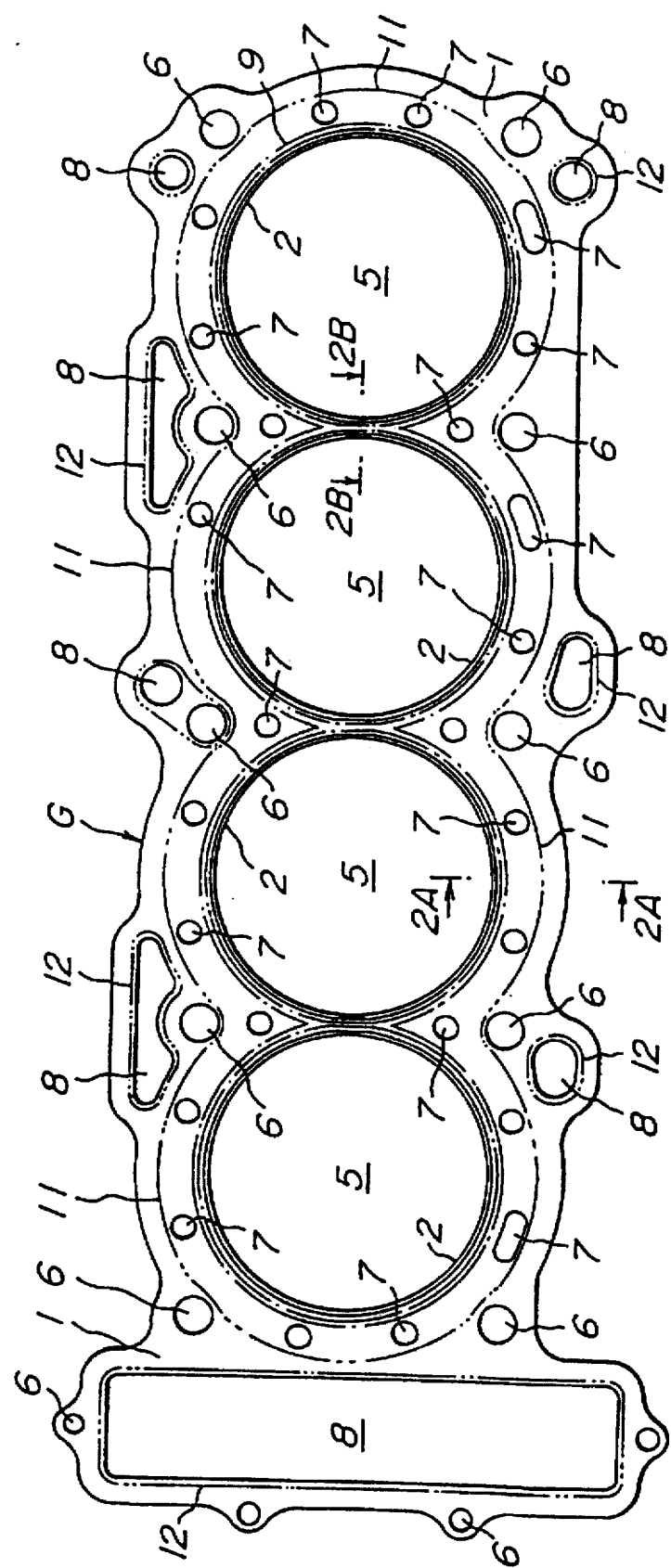
FIG. 1 is a plan view showing a metal gasket assembly according to the first embodiment of the present invention.
Figure 2A:
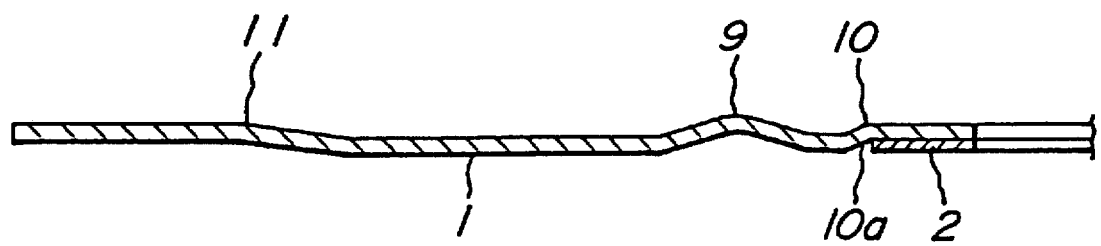
FIG. 2A is an enlarged sectional view taken along the line 2A—2A in FIG. 1.
Figure 2B:
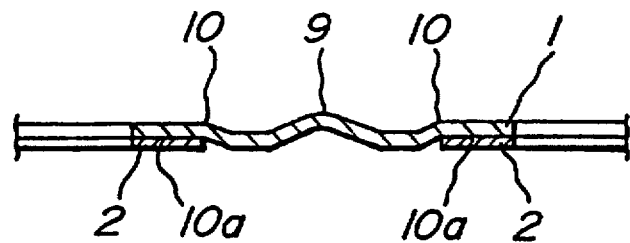
FIG. 2B is an enlarged sectional view taken along the line 2B—2B in FIG. 1.

Referring now to FIGS. 1, 2A and 2B, there is shown a metal gasket assembly according to the first embodiment of the present invention. Numerical reference 1 denotes a metal substrate, which is made of a metal sheet having a comparatively large thickness. For example, there is suitably used a stainless steel sheet (SUS 301) having a thickness of 0.2 to 0.25 mm. Numerical reference 2 denotes a shim, which is made of a metal sheet having a comparatively small thickness. For example, there is suitably used a stainless steel sheet (SUS 304) having a thickness of 0.01 to 0.1 mm. Numerical reference 5 denotes a cylinder opening; 6, a bolt hole; 7, a coolant opening; and 8, a lubricant opening.

In this metal gasket assembly, the metal substrate 1 is formed into a predetermined shape having apertures such as the cylinder openings 5, the bolt holes 6, the coolant openings 7, and the lubricant openings 8. The metal substrate 1 further has full-beads 9 provided in regions surrounding the cylinder openings 5, and half-beads 10 provided in circumferentially inner regions thereof. Other half-beads 11 and 12 are also provided on the metal substrate 1 in regions around the coolant openings 7 and in regions surrounding the lubricant openings 8, respectively. The ring-shaped shims 2 are attached to the metal substrate 1 by laser-welding so that they come into contact with the half-beads 10 on a substrate surface 10a where bulges of the full-beads 9 are not situated.

Figure 3A:
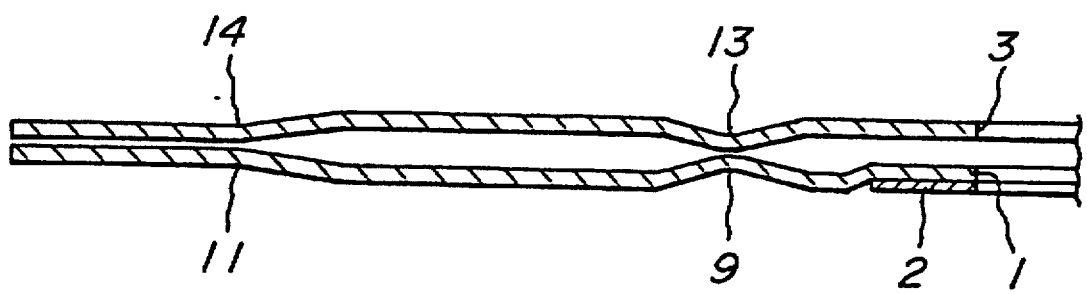
FIG. 3A is an enlarged sectional view showing a part of a metal gasket assembly according to the second embodiment of the present invention, which corresponds to the portion shown in FIG. 2A.
Figure 3B:
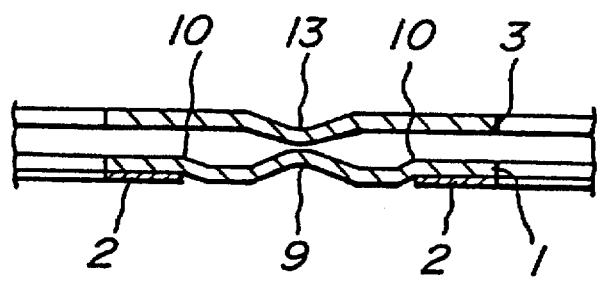
FIG. 3B is an enlarged sectional view showing a part of a metal gasket assembly according to the second embodiment of the present invention, which corresponds to the portion shown in FIG. 2B.

Referring to FIGS. 3A and 3B, there is shown a metal gasket assembly according to the second embodiment of the present invention. This metal gasket assembly also comprises the same metal substrate 1 and shims 2 as those in the first embodiment, and they are attached together in the same manner. Numerical reference 3 denotes a metal by-plate, which is made of the same kind of metal sheet as the metal substrate 1. For example, there is suitably used a stainless steel sheet (SUS 301) having a thickness of 0.2 to 0.25 mm. The metal by-plate 3 is formed to have the same planar configuration as the metal substrate 1, and provided with full-beads 13 in regions surrounding the cylinder openings 5 and half-beads 14 in regions around the coolant openings 7. The metal by-plate 3 is superposed on the metal substrate 1 so that a bulge of each full-bead 13 of the metal by-plate 3 is confronted with a bulge of the corresponding full-bead 9 of the metal substrate 1. In this connection, each half-bead 14 of the of the metal by-plate 3 is opposed to the corresponding half-bead 11 of the metal substrate 1.

Figure 4A:
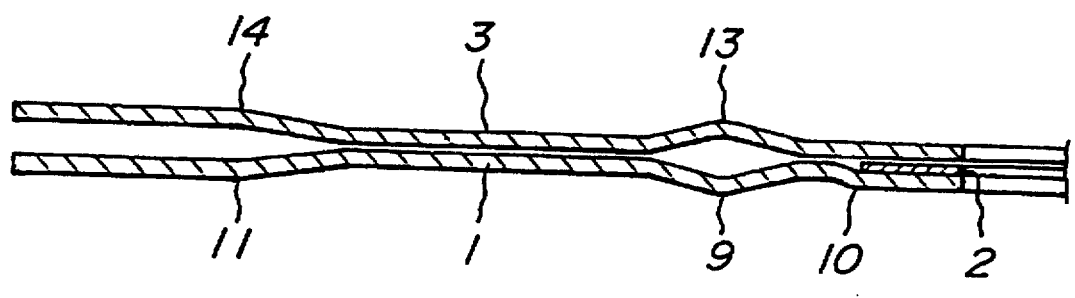
FIG. 4A is an enlarged sectional view showing a part of a metal gasket assembly according to the third embodiment of the present invention, which corresponds to the portion shown in FIG. 2A.
Figure 4B:
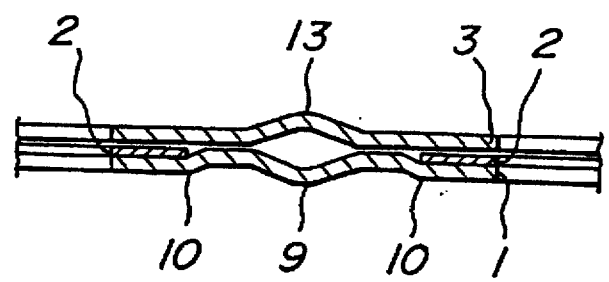
FIG. 4B is an enlarged sectional view showing a part of a metal gasket assembly according to the third embodiment of the present invention, which corresponds to the portion shown in FIG. 2B.

Referring to FIGS. 4A and 4B, there is shown a metal gasket assembly according to the third embodiment of the present invention. This metal gasket assembly is the same as that of the second embodiment except that the metal by-plate 3 is superposed on the metal substrate 1 so that the bulge of each full-bead 13 of the metal by-plate 3 is situated back to back with the bulge of the corresponding full-bead 9 of the metal substrate 1.

Referring to FIGS. 5A and 5B, there is shown a metal gasket assembly according to the fourth embodiment of the present invention. This metal gasket assembly comprises the same metal substrate 1 and shims 2 of the same arrangement as in the aforementioned embodiments. It further comprises an additional metal substrate 1, which is symmetrical with the metal substrate 1 with respect to a plane. The shims 2 are also attached to the additional metal substrate 1 by laser-welding in the same manner as in the case of the metal substrate 1. The two plane-symmetric metal substrates 1 are laminated so that a bulge of each full-bead 9 of the metal substrate 1 is situated back to back with a bulge of the corresponding full-bead 9 of the additional metal substrate 1.

Figure 6A:
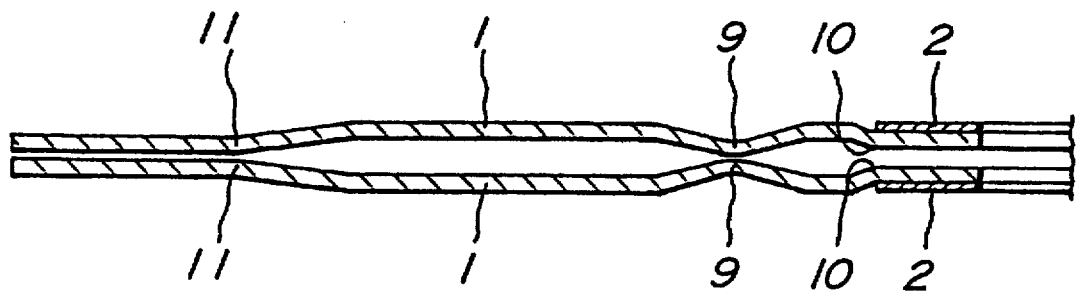
FIG. 6A is an enlarged sectional view showing a part of a metal gasket assembly according to the fifth embodiment of the present invention, which corresponds to the portion shown in FIG. 2A.
Figure 6B:
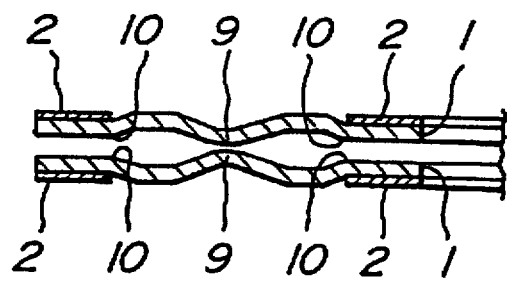
FIG. 6B is an enlarged sectional view showing a part of a metal gasket assembly according to the fifth embodiment of the present invention, which corresponds to the portion shown in FIG. 2B.

Referring to FIGS. 6A and 6B, there is shown a metal gasket assembly according to the fifth embodiment of the present invention. This metal gasket assembly is the same as that of the fourth embodiment except that the two plane-symmetric metal substrates 1 are laminated so that a bulge of each full-bead 9 of the metal substrate 1 is confronted with a bulge of the corresponding full-bead 9 of the additional metal substrate 1.

As mentioned above, a metal gasket assembly according to the present invention has such a basic structure that a metal substrate 1 is provided with full-beads 9 formed in regions surrounding cylinder openings 5, as well as half-beads 10 formed in circumferentially inner regions of the full-beads 9. In addition, ring-shaped shims 2 are attached to the metal substrate 1 so that they come into contact with the half-beads 10 on a substrate surface side where the bulges of the full-beads 9 are not situated. The sealing effect of the metal gasket assembly according to the present invention is significantly improved when compared with conventional ones, because the regions around the cylinder openings 5, which require the most effective sealing in the gasket assembly, are provided with dual beads of the full-beads 9 and the half-beads 10, and in addition the ring-shaped shims 2 are attached onto the surfaces of the half-beads.

In other words, since the ring-shaped shims 2 are superposed on the metal substrate 11 in regions where the half-beads 10 are situated, the metal gasket assembly has the greatest thickness in these regions. Consequently, when the metal gasket assembly is fastened between a cylinder block and a cylinder head, the fastening pressure works most on these portions of the metal gasket assembly. Moreover, there is a terraced part of the half-bead 9 on the circumferentially outer periphery of each shim 2, and a bulge of the full-bead 9 on the circumferentially outer side of the half-bead 10, thereby constituting double or triple sealing for the cylinder opening 5, which exhibits an improved effect.

Also, since a dent is formed on the surface of a metal substrate 1 between a bulge of each full-bead 9 and an adjoining half-bead 10, a sealant tends to stand in this dent when the metal substrate 1 is subjected to a coating, thereby further improving the sealing effect of the metal gasket assembly.

In the metal gasket assemblies according to the various embodiments of the present invention, some additional metal plates are laminated together with the metal substrate having the above-described basic structure in order to increase the applied fastening pressure and the bead rigidity. Accordingly, the sealing function has been further improved in these metal gasket assemblies.

While the present invention has been described with reference to certain preferred embodiments, they were given by way of examples only. It is of course that various changes and modifications may be made without departing from the scope of the present invention as defined by the appended claims.

We claim:

1. A metal gasket for a cylinder head, comprising a metal substrate having a predetermined shape with apertures including cylinder openings, bolt holes, coolant openings and lubricant openings, said metal substrate being provided with half-beads, in regions adjacent to the cylinder openings and full-beads in regions there around; said half-beads and full-beads all projecting in a first direction from a first side of said metal substrate, and ring shaped shims attached to a second side of said metal substrate and disposed within said half-beads.

2. A metal gasket as claimed in claim 1, there being between two of the cylinder openings a said half-bead and shim on each side of a same said full-bead.

* * * * *